Jan. 11, 1966  H. M. SHNEIDER  3,228,497
SPRING COIL CLUTCH AND ELECTRO-MAGNETIC BRAKE
Filed Dec. 9, 1963
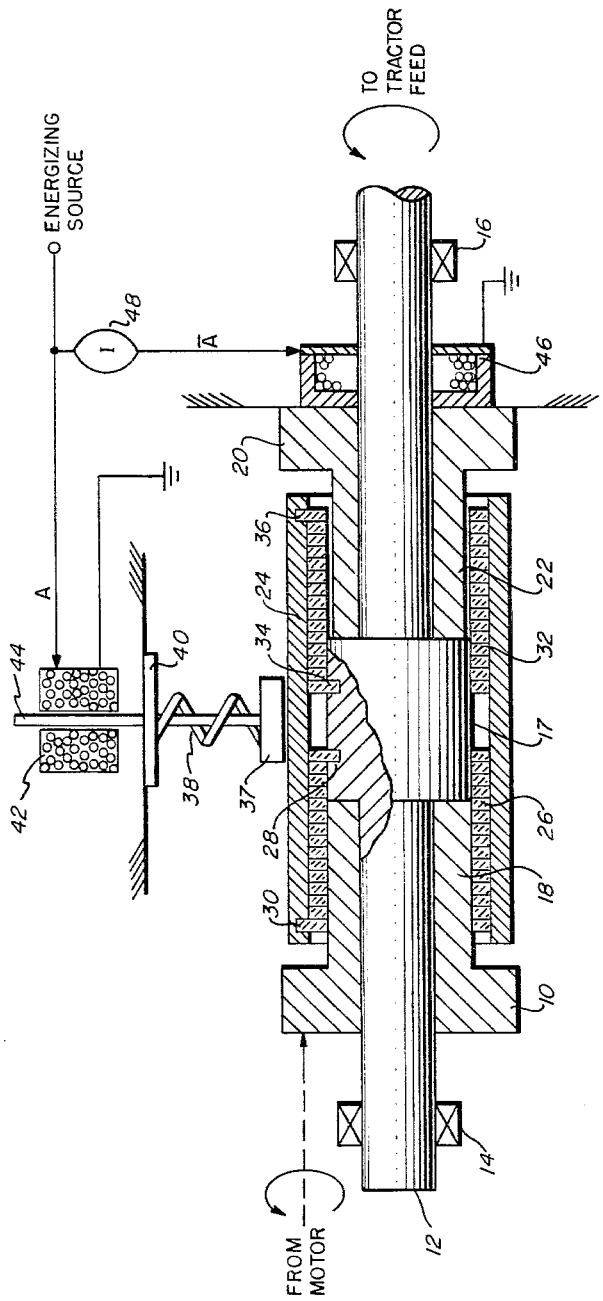
INVENTOR.
HAROLD M. SHNEIDER
BY Fred Jacob
ATTORNEY United States Patent Office 3,228,497
Patented Jan. 11, 1966

3,228,497
SPRING COIL CLUTCH AND ELECTRO-
MAGNETIC BRAKE
Harold M. Shneider, Weston, Mass., assignor to
Honeywell Inc., a corporation of Delaware
Filed Dec. 9, 1963, Ser. No. 328,921
8 Claims. (Cl. 192—12)

The present invention relates in general to new and improved torque-coupling devices, in particular to coupling devices employing wrapped springs to couple torque between two independent rotary members.

The use of wrapped springs for clutching onto a moving member, de-clutching therefrom or for braking the rotation of a moving member is well known in the art. Basically, the wrapped spring consists of a coiled helix whose ends or tangs may be anchored in a pair of independently rotatable members. The motion of one member will be transmitted to the other member through the helix which, under normal conditions, has a predetermined inside diameter. If a drag is applied to one of the two rotating members, the end of the spring which is anchored therein is caused to lag the other end. As a result, the spring diameter is either contracted or expanded, depending on the sense in which it is wound. This change of diameter may be used to engage or disengage a third member (rotatable or stationary) which is positioned within the spring. In this manner, by selectively applying a force torque to one member, a torque may be controllably coupled between the other two members.

Wrapped-spring torque couplings have found application in many areas where rapid response and mechanical amplification of a small input are required. Paper feed engines for line-at-a-time printers, where the paper web must be moved rapidly between lines before it is arrested for printing, represent one such application. Here, rapid response and mechanical amplification of a small input force are both necessary in order to provide satisfactory operation. If the paper feed engine has relatively high inertia, it may be operated at a constant velocity, while a tractor feed device which, by engaging the sprocket holes of the paper web moves the latter, is clutched onto the engine output shaft or de-clutched therefrom in accordance with the number of line spaces the paper is to be moved to each print position.

Since the inertia of the tractor feed device itself is appreciable, de-clutching alone from the paper feed engine is not sufficient to prevent overshoot so as to arrest the paper precisely at the desired line space. To this end, braking means must be provided in such an arrangement to bring the paper to a halt at the desired location. In one such arrangement where a wrapped-spring torque coupling is used for selectively clutching to the paper feed engine shaft, advantage is taken of the expanding diameter of the wrapped spring upon disengagement from the shaft to apply a braking force. Specifically, with a drag force applied to one end of the wrapped spring, the inertia of the tractor feed device will continue to rotate the member to which the other spring end is anchored after de-clutching has taken place. If a stationary sleeve surrounds the spring, the frictional contact between the sleeve and the expanding spring coils may be employed to halt the tractor feed shaft to which the other spring end is anchored. The disadvantage of such operation lies in the fact that it requires the tractor feed shaft to continue its rotation after de-clutching has taken place. Such an arrangement therefore, is not suitable for promptly and accurately arresting the moving paper web.

In another arrangement, two separate wrapped springs are employed, one for selectively clutching the tractor feed shaft to the paper feed engine shaft and the other for clutching the tractor feed shaft to a stationary braking member when the first spring is de-clutched. Experience has shown that such an arrangement is very critical with regard to the timing of the mutually exclusive operation of the clutch and brake respectively. It requires the use of separate brake shoes for applying drag to the respective sleeves, such brake shoes being ordinarily electromagnetically actuated. While the generation of mutually exclusive signals for energizing the aforesaid brake shoes presents no problem, the build-up and collapse of the magnetic fields of the actuators is not necessarily instantaneous. Thus, a certain amount of overlapping of the action of the two brake shoes is present so that starting and stopping of the tractor feed, which directly controls the position of the paper, is neither rapid nor precise.

It is the primary object of the present invention to provide a torque-coupling device which is not subject to the foregoing disadvantages.

It is another object of the present invention to provide a wrapped-spring torque-coupling device wherein the clutching and braking operations of the driven member are effected mutually exclusively.

It is a further object of the present invention to provide a wrapped-spring torque-coupling device wherein the driven member is rapidly and precisely activated or braked.

It is an additional object of the present invention to provide a wrapped-spring torque coupling device wherein a single actuator controls the driving and braking of the driven member.

The novel features of the present invention, together with further objects and advantages thereof, will become apparent from the following detailed specification with reference to the accompanying drawing, in which the sole figure illustrates in cross-section a preferred embodiment of the present invention.

With reference now to the drawing, an input sleeve 10 is mechanically connected to a rotary input source, as indicated by the broken-line arrow. The input sleeve may take the form of a pulley which is belt-coupled to a motor that applies a rotary torque in the direction indicated. The sleeve is rotatably positioned on a shaft 12, the far end of which may be connected to a tractor feed device for moving the paper web in the example under consideration. The shaft 12 is rotatably disposed in a pair of bushings 14 and 16 and further includes a raised shoulder 17. The sleeve 10 is seen to be disposed to one side of the shoulder 17 and its right-hand portion 18 has an outside diameter which is substantially the same as that of the shoulder 17. A stationary sleeve 20 is disposed to the other side of the shoulder 17 and rotatably receives the shaft 12 in its bore. The left-hand portion of 22 of the sleeve 20 is seen to have an outside diameter that is less than that of the shoulder 17.

An outer sleeve 24 is disposed coaxial with respect to the shaft 12, out of contact with the shoulder 17 and the sleeve ends 18 and 22, so as to define a space therebetween. A helical spring 26 is disposed in a portion of the aforesaid space and has coils that may be substantially square in cross-section. One end or tang 28 of the spring 26 is anchored in the shoulder 17 while the other end 30 is anchored in the sleeve 24. In its normal position, there is diametral interference between the outside surface of the sleeve end 18 and the inside surface of the spring 26, so that the latter firmly engages the sleeve end 18.

A helical spring 32 is substantially identical to the spring 26 and is assumed in the present example to be wound in the same manner as the latter. The spring 32 has one of its ends 34 anchored in the shoulder 16. It will be seen that the end 34 is opposite with respect to the end 28 of the like-wound spring 26. The other end 36 of the spring 32 is anchored in the outer sleeve 24. In its unstressed condition, the spring 32 clears the end 22 of the stationary sleeve 20 so that the input sleeve 10, the shaft 12, the springs 26 and 32 and the outer sleeve 24 all rotate together when a rotary torque is applied from the motor.

A brake shoe 37 is urged against the outer sleeve 24 by a compression spring 38 which bears against a stationary member 40. An electromagnetic actuator 42, which has an armature 44, is adapted to be selectively energized to pull the brake shoe 36, which is attached to the armature, out of contact with the outer sleeve 24. A stationary electromagnetic brake 46 is positioned to operate on the shaft 12. The brake 46 is connected to be energized from an inverter 48 which, in turn, is energized from the same source as the actuator 42.

In operation, the input sleeve 10, the shaft 12, the springs 26 and 32 and the outer sleeve 24 will rotate together, as previously explained, when the input sleeve is driven from the motor. When the compression spring 38 urges the brake shoe 36 against the outer sleeve 24, a drag force is applied to the latter which causes the outer sleeve to lag behind the shaft. The ends 30 and 36 of the springs 26 and 32 respectively being anchored in the outer sleeve, they will lag behind the ends 28 and 34 respectively, which are anchored in the shaft shoulder 17. Assuming both springs are coiled in the clockwise direction when looking toward the motor, the result of applying a drag force to the outer sleeve 24 will be for the spring 26 to uncoil slightly, so as to expand in diameter. As a consequence, the input sleeve 10, which was previously gripped by the spring 26, is disengaged and no further power is transmitted to the shaft 12.

The situation is reversed in the case of the spring 32 which is wound in the same direction as the spring 26 but has the same forces applied to opposite ends thereof. Thus, the effect on the spring 32 of applying a drag force to the outer sleeve 24 will be to coil up the spring more tightly. This action decreases the inside diameter of the spring 32 and causes it to engage the end 22 of the stationary sleeve 20. As a consequence, the rotary motion of the shaft 12, to which the spring 32 is anchored through the shoulder 17, is arrested.

It will be clear from the foregoing explanation that the disengagement of the input sleeve 10 and the engagement of the stationary sleeve 20, both result from the action of the single brake shoe 37 on the outer sleeve 24. These actions therefore not only occur rapidly, as determined by the characteristic of the substantially identical springs 26 and 32, but they are also mutually exclusive. Indeed, the shaft 12 may be brought to a halt so quickly by the above-described arrangement that a reverse torque is applied thereto due to the resilience of the springs, which may be sufficient to cause the shaft to rotate a very short distance in the opposite direction. An electromagnetic drag brake 46 may be provided to act directly on the shaft 12 in order to inhibit the aforesaid reverse shaft motion. The brake 46 is energized only when the electromagnetic actuator 42 is de-energized.

Where drag is to be applied to the shaft 12 in order to suppress the reverse shaft motion, the signal $\overline{A}$ which is applied to the brake 46 from the inverter 48 is active, while the signal A is zero. Conversely, when a signal A is applied from the energizing source, the signal $\overline{A}$ becomes zero and the brake 46 releases the shaft 12. The energization of the actuator 42 in the latter case, causes the brake shoe 36 to be withdrawn against the action of the resilient compression spring 38. Since drag is now no longer applied to the outer sleeve 24, there will be no displacement of the spring ends 30 and 36 with respect to the ends 28 and 34 respectively. Thus, the spring 32 expands to its normal size and releases the stationar sleeve 20. Simultaneously, the spring 26 contracts to its normal size to engage the rotating input sleeve 10 so as to transmit power to the shaft 12.

It will be apparent from the foregoing explanation of the present invention that modifications may now be effected which lie well within the scope of the present invention. For example, the springs 26 and 32 need not have identical inside diameters, provided only that one spring normally engages the inner sleeve 10 and the other spring is normally disengaged from the sleeve 20. The springs need not have a square cross-section, particularly for low torque requirements. The brake shoe 37 may be operated normally in contact with the sleeve 24 or out of contact, provided only that the selective energization of the actuator 42 alters its position to reverse the existing action of the springs.

The action illustrated in the drawing has, however, the advantage of being "fail-safe." Should there be a power failure to coil 42, the system would immediately stop. In a reverse configuration, a power failure would cause the paper to "run away."

The invention is not limited to the precise configuration shown. For example, the springs 26 and 32 need not be anchored in the shoulder 17 by means of the ends 28 and 34 respectively, but may engage the shoulder with a frictional interference fit. It is also possible to use a single helical spring and anchor it at its center in the shoulder 17. The ends of such a spring would still be anchored at opposite ends of the sleeve 24 and act in precisely the same manner as the separate springs described above. It is, of course, possible to use the spring expansion to bring the spring into engagement with the desired driving or arresting member, while spring contraction could be employed as a release from engagement with such member. The electromagnetic brake 46, while desirable to enhance the operation of the invention, can be dispensed with provided the spring action is carefully reguated.

From the foregoing disclosure of the invention, it will be apparent that numerous modifications, changes and equivalents will now occur to those skilled in the art, all of which fall within the true spirit and scope contemplated by the invention.

What is claimed is:

1. A torque-coupling device comprising a rotatable shaft, a raised shoulder on said shaft, first and second like-wound helical springs coaxial with said shaft and having opposite ends thereof anchored to said shoulder, an outer sleeve coaxially surrounding said springs and anchored to the free ends thereof, a rotatable inner sleeve coaxial with said shaft and encircled in normally gripping engagement by said first spring, a stationary inner sleeve coaxial with said shaft and encircled by said second spring normally out of engagement therewith, means for applying rotary power to said rotatable inner sleeve, and means for selectively impeding the rotation of said outer sleeve to reverse the normal action of said first and second springs.

2. A torque-coupling device comprising a stationary member, a first rotary member rotatable about a common axis with respect to said stationary member, a second rotary member rotatable about said axis with respect to said first rotary member, a first helical spring having one end thereof anchored in said first rotary member and encircling said second rotary member normally in frictional engagement therewith, a second helical spring having the opposite end thereof anchored in said first rotary member and encircling said stationary member normally out of engagement therewith, a rotary connecting member anchored to the free ends of said springs, means for applying a rotary torque to said second rotary member, and means for selectively impeding the rotation of said connecting member.

3. A torque-coupling device comprising a rotatable shaft, helical spring means coaxial with said shaft and anchored thereto, said spring means including first and second portions having opposite ends thereof rigidly coupled together, rotary input means coaxial with said shaft and having a surface normally adapted to be frictionally engaged by said first spring means portion, stationary arresting means coaxial with said shaft and having a surface normally adapted to be disengaged from said second spring means portion, and means for selectively applying a rotation-opposing force to said rigidly joined ends to reverse the normal action of said first and second spring means portions relative to the surfaces of said input and arresting means.

4. A torque-coupling device comprising a rotatable shaft, an outer sleeve coaxial with said shaft and defining a space therebetween, helical spring means coaxial with said shaft and anchored thereto, said spring means including first and second portions having opposite ends thereof anchored to said outer sleeve, a rotatable inner sleeve coaxial with said shaft and normally adapted to be frictionally engaged by said first spring means portion, a stationary inner sleeve coaxial with said shaft and normally adapted to be disengaged from said second spring means portion, means for rotating said rotatable inner sleeve, and means for selectively impeding the rotation of said outer sleeve to reverse the normal action of said first and second spring means portions respectively.

5. A torque-coupling device comprising a rotatable shaft, an input sleeve rotatably mounted on said shaft and adapted to have rotary torque applied thereto, a stationary sleeve axially spaced from said input sleeve and rotatably receiving said shaft, first and second like-wound helical springs encircling said input and stationary sleeves respectively and having opposite ends anchored therebetween to said shaft, the normal inside diameters of said springs producing interference only with said input sleeve to establish a frictional coupling therewith, an outer sleeve surrounding said springs and anchored to the free ends of said springs, and means for selectively applying a drag force to said outer sleeve.

6. The apparatus of claim 5 and further comprising separate stationary brake means for operating on said shaft, and means for actuating said brake means simultaneously with the application of said drag force.

7. A torque-coupling device comprising a rotatably supported shaft, a cylindrical shoulder on said shaft, a first sleeve rotatably disposed on said shaft and positioned axially to one side of said shoulder, the outside diameter of said first sleeve and said shoulder respectively being substantially identical, means for applying rotary power to said first sleeve, a second sleeve axially positioned to the other side of said shoulder and having an outside diameter less than the latter, said second sleeve being fixed against rotational motion and rotatably receiving said shaft, a third sleeve surrounding said shoulder and said first and second sleeves and defining a coaxial space therebetween, a pair of like-wound helical springs disposed in said space, one of said springs having one end thereof anchored to said shoulder and being normally adapted to encircle said first sleeve in frictional engagement therewith, the other of said springs having its opposite end anchored to said shoulder and encircling said second sleeve normally out of engagement therewith, the free ends of said springs being anchored to said third sleeve, a brake shoe, resilient means urging said brake shoe into contact with said third sleeve, and electromagnetic actuating means for selectively withdrawing said brake shoe from contact with said third sleeve.

8. The apparatus of claim 7 and further comprising electromagnetic brake means for operating on said shaft, and means for energizing said brake means when said actuating means is de-energized.

References Cited by the Examiner
UNITED STATES PATENTS

| 2,577,181 | 12/1951 | Christensen. |
| 2,939,329 | 6/1960 | Doerries. |
| 2,940,563 | 6/1960 | Milenkovic et al. |
| 3,154,727 | 10/1964 | Hulls. |

FOREIGN PATENTS

| 539,158 | 4/1957 | Canada. |

DAVID J. WILLIAMOWSKY, *Primary Examiner.*